(12) United States Patent
Bailey

(10) Patent No.: US 11,718,117 B1
(45) Date of Patent: Aug. 8, 2023

(54) METHODS AND SYSTEMS FOR PROCESSING TESSELLATED GRAPHICS FOR DIGITAL PRINTING

(71) Applicant: Global Graphics Software Limited, Cambridge (GB)

(72) Inventor: Martin Bailey, Cambridgeshire (GB)

(73) Assignee: GLOBAL GRAPHICS SOFTWARE LIMITED, Cambridge (GB)

(*) Notice: Subject to any disclaimer, the term of this patent is extended or adjusted under 35 U.S.C. 154(b) by 49 days.

(21) Appl. No.: 17/670,942

(22) Filed: Feb. 14, 2022

(51) Int. Cl.
| | |
|---|---|
| G06K 9/46 | (2006.01) |
| G06T 17/20 | (2006.01) |
| G06T 7/73 | (2017.01) |
| G06T 5/40 | (2006.01) |
| G06T 3/00 | (2006.01) |
| B41M 3/18 | (2006.01) |
| G06K 15/02 | (2006.01) |
| B41M 1/10 | (2006.01) |

(52) U.S. Cl.
CPC .............. B41M 3/18 (2013.01); B41M 1/10 (2013.01); G06K 15/1836 (2013.01); G06K 15/1844 (2013.01); G06K 15/1848 (2013.01)

(58) Field of Classification Search
None
See application file for complete search history.

(56) References Cited

U.S. PATENT DOCUMENTS

| | | | |
|---|---|---|---|
| 2015/0154797 A1* | 6/2015 | Sou | G06T 17/205 345/423 |
| 2021/0089806 A1* | 3/2021 | Qiu | G06V 10/443 |

* cited by examiner

*Primary Examiner* — Andrew H Lam
(74) *Attorney, Agent, or Firm* — Branch Partners PLLC; Bruce E. Black

(57) ABSTRACT

A method for printing a product that includes a graphic that is tessellated includes receiving or generating the graphic and a tessellation pattern for the graphic; determining a first repeated swath using at least the graphic and the tessellation pattern, wherein the product to be printed includes at least two instances of the first repeated swath, wherein the first repeated swath includes i) at least two full copies of the graphic, ii) at least two partial copies of the graphic; or iii) at least one full copy and at least one partial copy of the graphic; generating raster data of the first repeated swath; and printing the product using the raster data of the first repeated swath to print the first repeated swath at least twice.

20 Claims, 9 Drawing Sheets

METHODS AND SYSTEMS FOR PROCESSING TESSELLATED GRAPHICS FOR DIGITAL PRINTING

FIELD

The present invention is directed to the area of processing graphics for printing and printing the processed graphics. The present invention is also directed to methods and systems for processing and printing tessellated graphics.

BACKGROUND

A variety of products including, but not limited to, textiles, wallcoverings and other décor include at least one graphic (which may be composed of multiple elements) that is repeated multiple times on the printed output (i.e., tessellated). In some instances, the graphic is tessellated into a simple rectangular grid pattern. In other cases, the tessellated graphics on each row may be offset sideways by some amount from the rows above and below ("a brick pattern") or the graphics in each column may be offset vertically from those in the adjoining columns ("a drop pattern"). Grid, brick, and drop patterns are common in textile printing and brick and drop patterns are common for wallcoverings.

Although textiles, wall coverings, and the like can be printed in lengths as short as a few meters, these products are often printed in very long, seamlessly continuous lengths of multiple feet, yards, meters, miles, or kilometers. Historically, such printing has been accomplished using a printing technology such as screen printing, gravure printing, flexography, or offset lithography. Once a cylinder, drum, or plate with the tessellated pattern has been created a very long length of product can be produced as easily as a short one. As product providers adopt digital printing (for example, inkjet or electrophotographic printing), the current methods of preparing a tessellated product have become more challenging.

Creation of a single design that includes all of the repeats of the graphic in the form of, for instance, a single PDF page can result in a file that is difficult for the digital front end (DFE) of a digital press to manage. This is the case even if the graphic is encoded as, for example, a Form or Image Xobject in the file so that there is only a single copy of the description of the graphic itself, which is referenced and placed multiple times in the design. As an example, a 100 m roll of wallcovering on which a graphic is placed that is 51 cm wide (a standard size in Europe) and 40 cm tall, with a 15 cm drop would include 752 instances of the same graphic. There is a need for methods and systems to facilitate the production of tessellated products using for printing, for example, for digital printing.

BRIEF SUMMARY

One embodiment is a method for printing a product that includes a graphic that is tessellated. The method includes receiving or generating the graphic and a tessellation pattern for the graphic; determining a first repeated swath using at least the graphic and the tessellation pattern, wherein the product to be printed includes at least two instances of the first repeated swath, wherein the first repeated swath includes i) at least two full copies of the graphic, ii) at least two partial copies of the graphic; or iii) at least one full copy and at least one partial copy of the graphic; generating raster data of the first repeated swath; and printing the product using the raster data of the first repeated swath to print the first repeated swath at least twice.

Another embodiment is a system for printing a product that includes a graphic that is tessellated. The system includes at least one processor configured and arranged to perform actions. The actions include receiving or generating the graphic and a tessellation pattern for the graphic; determining a first repeated swath using at least the graphic and the tessellation pattern, wherein the product to be printed includes at least two instances of the first repeated swath, wherein the first repeated swath includes i) at least two full copies of the graphic, ii) at least two partial copies of the graphic; or iii) at least one full copy and at least one partial copy of the graphic; generating raster data of the first repeated swath; and printing the product using the raster data of the repeated swath to print the first repeated swath at least twice. In at least some embodiments, the system includes a printing device that includes, or is in communication with, the at least one processor.

A further embodiments is a non-transitory computer-readable medium having processor-executable instructions for printing a product that includes a graphic that is tessellated. The processor-executable instructions when installed onto a device enable the device to perform actions. The actions include receiving or generating the graphic and a tessellation pattern for the graphic; determining a first repeated swath using at least the graphic and the tessellation pattern, wherein the product to be printed includes at least two instances of the first repeated swath, wherein the first repeated swath includes i) at least two full copies of the graphic, ii) at least two partial copies of the graphic; or iii) at least one full copy and at least one partial copy of the graphic; generating raster data of the first repeated swath; and printing the product using the raster data of the first repeated swath to print the repeated swath at least twice.

In at least some embodiments, the tessellation pattern is a brick pattern. In at least some embodiments, the tessellation pattern is a drop pattern. In at least some embodiments, the tessellation pattern is a grid pattern.

In at least some embodiments, the method or the actions further include determining a second repeated swath, wherein the product to be printed includes at least two instances of the second repeated swath, wherein the second repeated swath includes i) at least two full copies of the graphic, ii) at least two partial copies of the graphic; or iii) at least one full copy and at least one partial copy of the graphic; generating the raster data of the second repeated swath; wherein printing the product includes printing the product using the raster data of the second repeated swath to print the second repeated swath at least twice.

In at least some embodiments, the method or the actions further include determining an unrepeated swath, wherein the product to be printed includes only a single instance of the unrepeated swath, wherein the unrepeated swath includes i) at least two full copies of the graphic, ii) at least two partial copies of the graphic; or iii) at least one full copy and at least one partial copy of the graphic; generating the raster data of the unrepeated swath; wherein printing the product includes printing the product using the raster data of the unrepeated swath to print the unrepeated repeated swath only once. In at least some embodiments, the unrepeated swath is a combination of the repeated swath and at least one additional graphic. In at least some embodiments, the at least one additional graphic is selected from a banner, an eye mark, a cutting guide, or any combination thereof. In at least some embodiments, printing the product includes printing the unrepeated swath first or last.

In at least some embodiments, the first repeated swath is a horizontal swath extending horizontally from one edge of the product to an opposite edge of the product. In at least some embodiments, determining a first repeated swath includes determining a first height of the first repeated swath, wherein the first height equals a height of the graphic. In at least some embodiments, determining a first repeated swath includes determining a first height of the first repeated swath, wherein the first height equals a height of the graphic multiplied by an integer greater than one.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of processing graphics for printing and printing the processed graphics. The present invention is also directed to methods and systems for processing and printing tessellated graphics.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The methods described herein can be performed using any type of processor and any suitable type of device that includes a processor.

Figure 1:
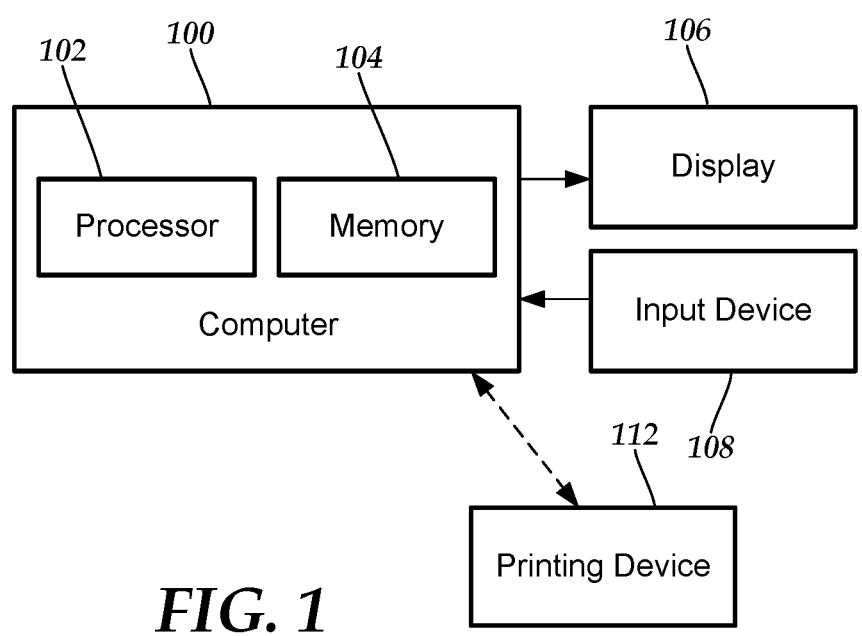
FIG. 1 is a schematic block diagram of one embodiment of a system for processing documents for printing, according to the invention.

FIG. 1 illustrates one embodiment of a system for practicing the invention. The system can include a computer 100 or any other device that includes a processor 102 and a memory 104, a display 106, an input device 108, and a printing device 112, such as a printer or press. The printing device 112 can be a digital press (for example, electrophotographic or inkjet presses), a conventional press (for example, (offset lithographic, flexographic, or gravure presses), an inkjet device, a laser printing device, or any other suitable printing device. Unless otherwise indicated, the terms "printing device" and "press" are used interchangeably herein. In some embodiments, one or more of the computer 100, display 106, or input device 108 can be part of the printing device 112.

The computer 100 can be a laptop computer, desktop computer, server computer, tablet, mobile device, smartphone, or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal.

By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

In at least some embodiments, the systems and methods described herein can facilitate digital printing of tessellated graphics using digital printing devices. In at least some embodiments, the systems and methods described herein can have increased speed or efficiency when preparing digital print jobs that include tessellated graphics. Tessellated graphics are used in a variety of products including, but not limited to, textiles, wallcoverings, and other décor where a single graphic is repeated multiple times on the printed output.

Figure 2:
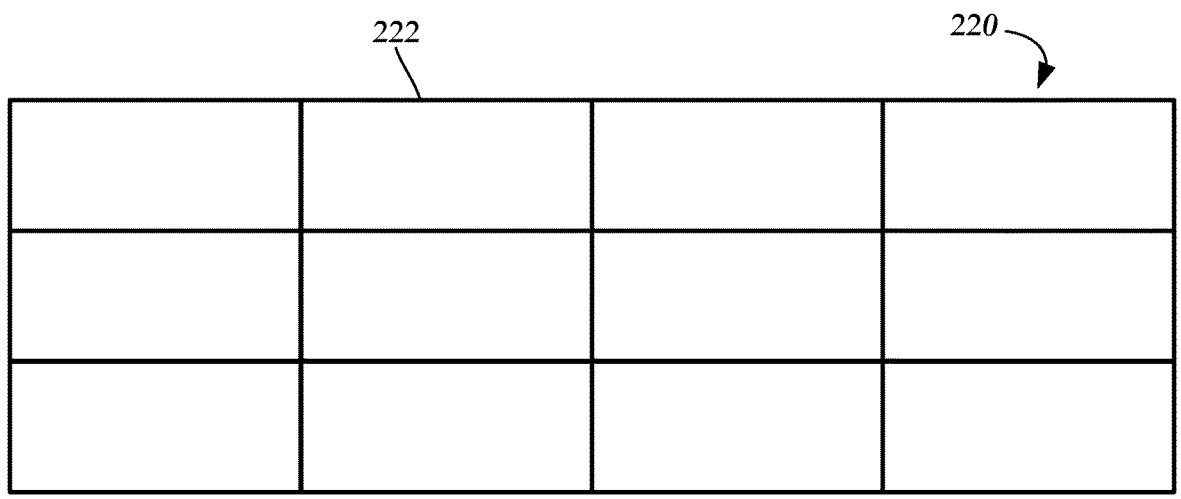
FIG. 2 illustrates a graphic arranged in a grid pattern.
Figure 3:
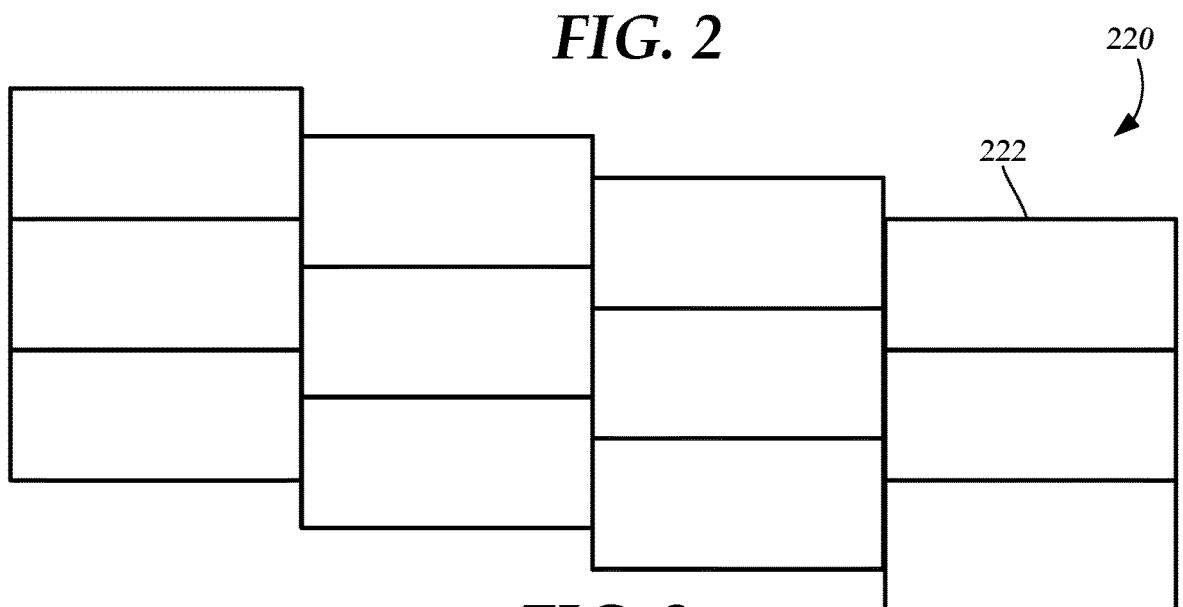
FIG. 3 illustrates a graphic arranged in a drop pattern.
Figure 4:
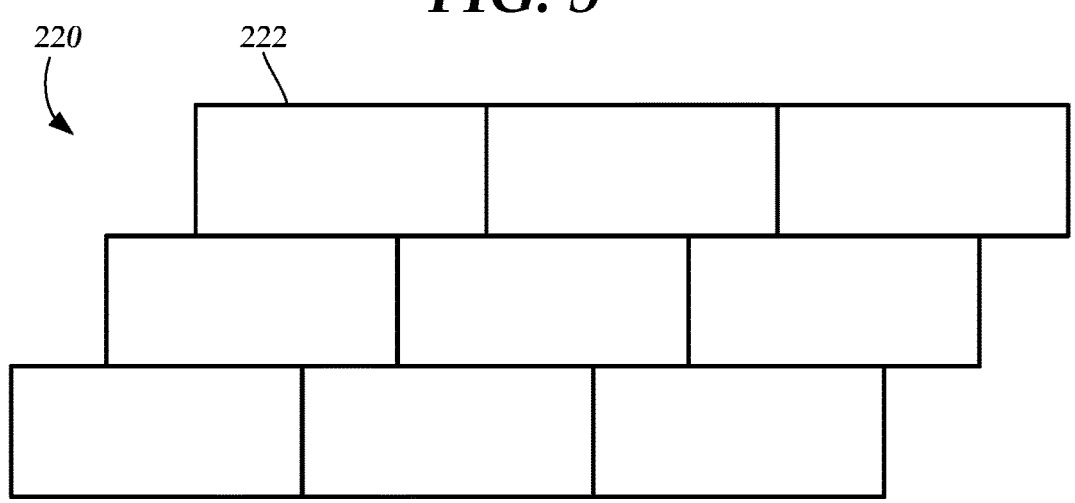
FIG. 4 illustrates a graphic arranged in a brick pattern.

FIGS. 2 to 4 illustrate examples of different tessellation patterns 220 of a graphic (represented by box 222). FIG. 2 illustrates one example of a grid pattern. FIG. 3 illustrates one example of a drop pattern. FIG. 4 illustrates one example of a brick pattern. The grid, drop, and brick patterns are merely examples of tessellation patterns. Any other suitable tessellation pattern can be used. To make a rectangular shape, partial copies of the graphic can be added to the rows and columns of the brick, drop, or other suitable tessellation patterns, as illustrated, for example, in FIGS. 5, 6, and 8 to 12.

In at least some embodiments, the system or method identifies and constructs a portion of the output ("a swath"— see, swath 530 (530a, 530b, 530c, 530d, 530e) of FIGS. 5, 6, and 8 to 12) that can be rendered and then sent to the digital printing device for printing multiple times. The swath is not the same as the graphic. In at least some embodiments, the swath includes at least one full copy of the graphic and at least one partial copy of the graphic. In at least some embodiments, the swath includes at least two, three, four, or more partial copies of the graphic. In at least some embodiments, the swath includes two, three, four, or more full copies of the graphic.

Figure 5:
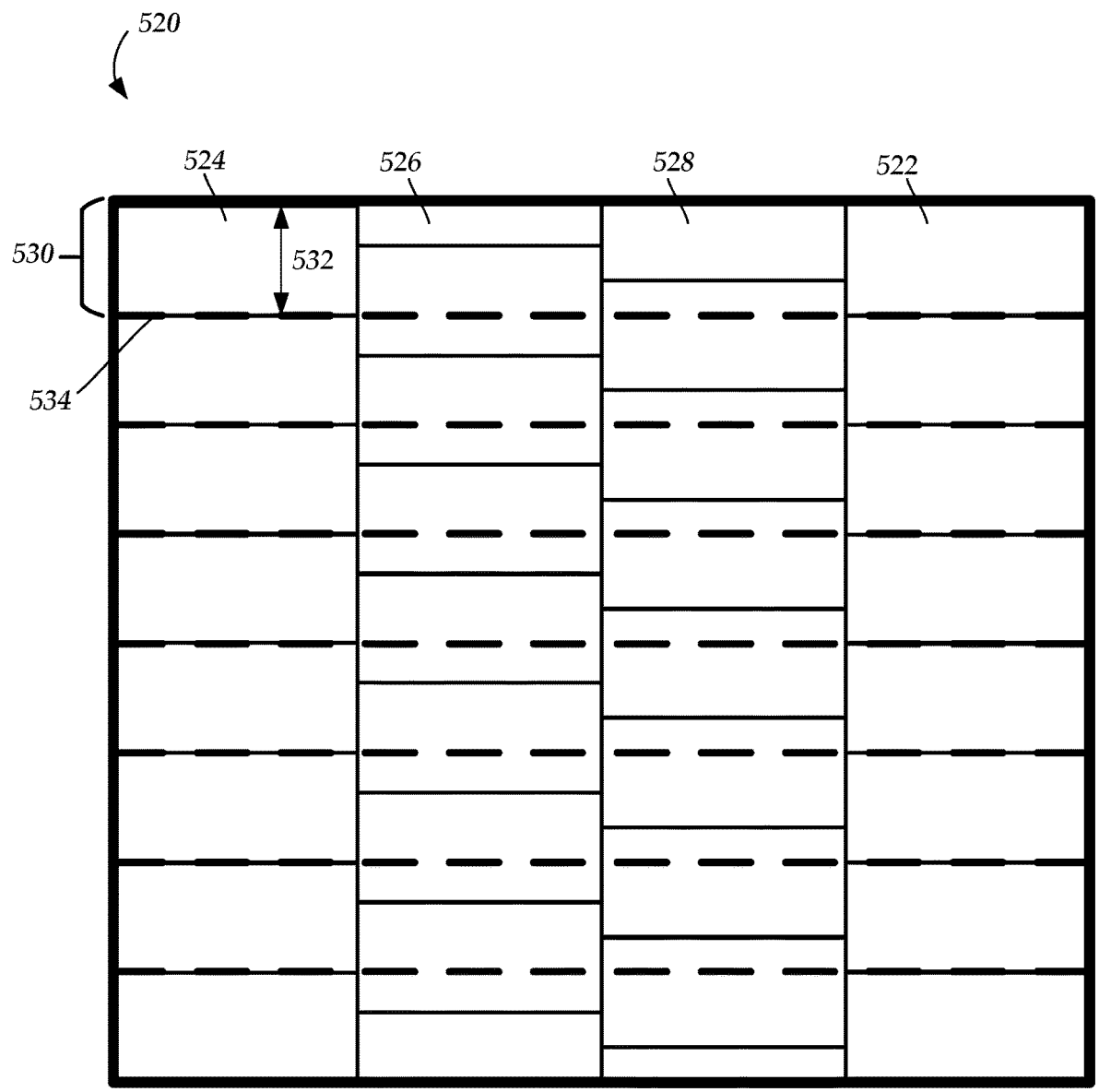
FIG. 5 illustrates one embodiment of a product to be printed with a graphic arranged in a drop pattern and divided into swaths, according to the invention.

The term "full copy of the graphic" means a copy of the graphic that is uncut and is not a combination of two or more separate parts of the graphics. As an example, box 522 represents a graphic that is tessellated in FIG. 5 in a drop pattern and in FIG. 6 in a brick pattern to produce a product 520. Element 524 of FIG. 5 is an example of a full copy of the graphic represented by the box 522. Swath 530 of FIG. 5 contains two full copies of the graphic 522.

The term "partial copy of the graphic" means a portion of the graphic that is less than the whole graphic. Elements 526, 528 of FIG. 5 are examples of a partial copy of the graphic represented by the box 522. Swath 530 of FIG. 5 contains four partial copies of the graphic 522.

Figure 6:
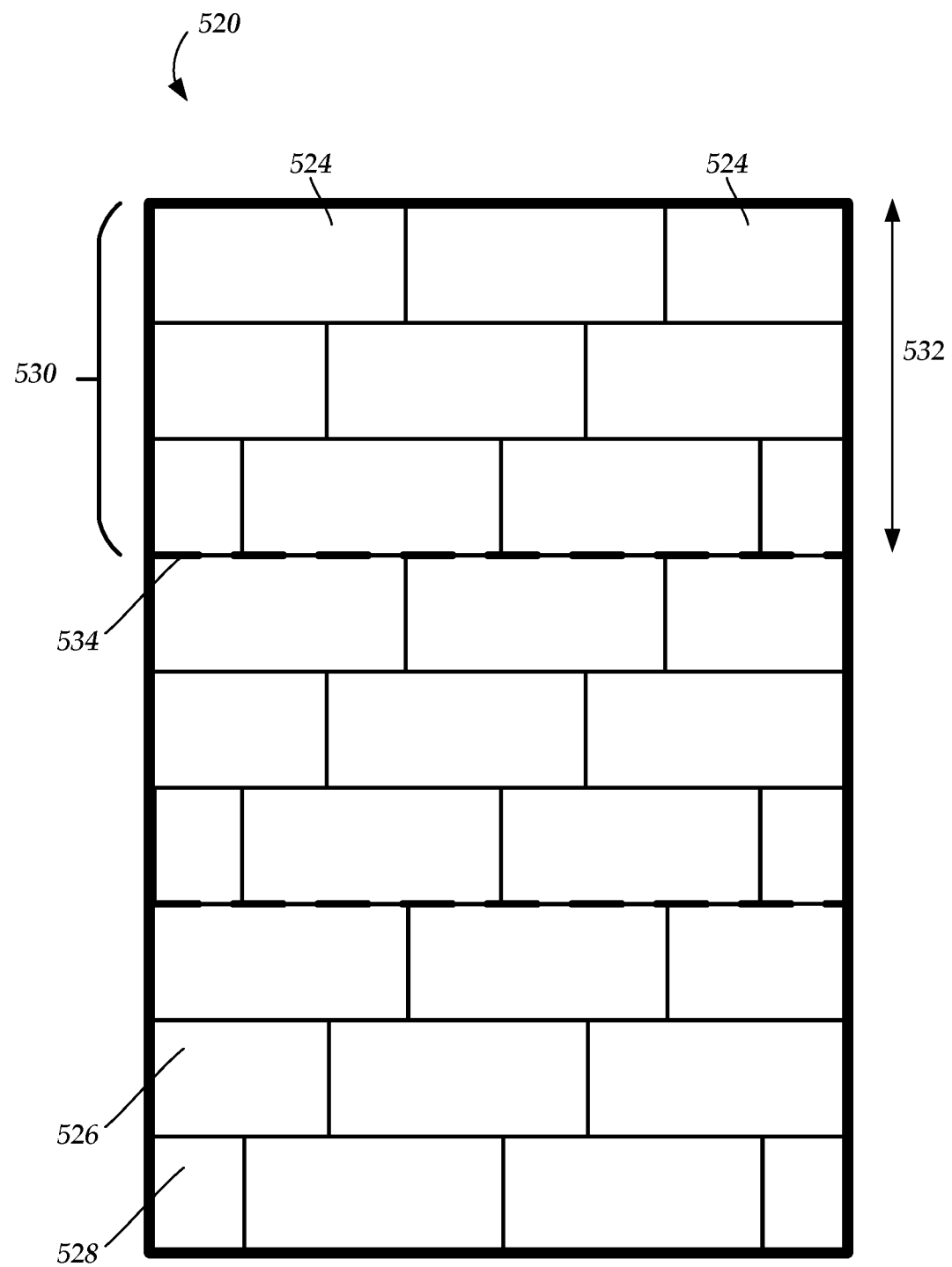
FIG. 6 illustrates one embodiment of a product to be printed with a graphic arranged in a brick pattern and divided into swaths, according to the invention.

In FIGS. 5 and 6, one embodiment of a product 520 is divided into swaths 530 with a swath height 532. Swath division lines 534 are presented in the Figures to facilitate identification of the separate swaths. In FIG. 5, the product 520 is divided into eight swaths 530. In FIG. 6, the product 520 is divided into three swaths 530.

Figure 9:
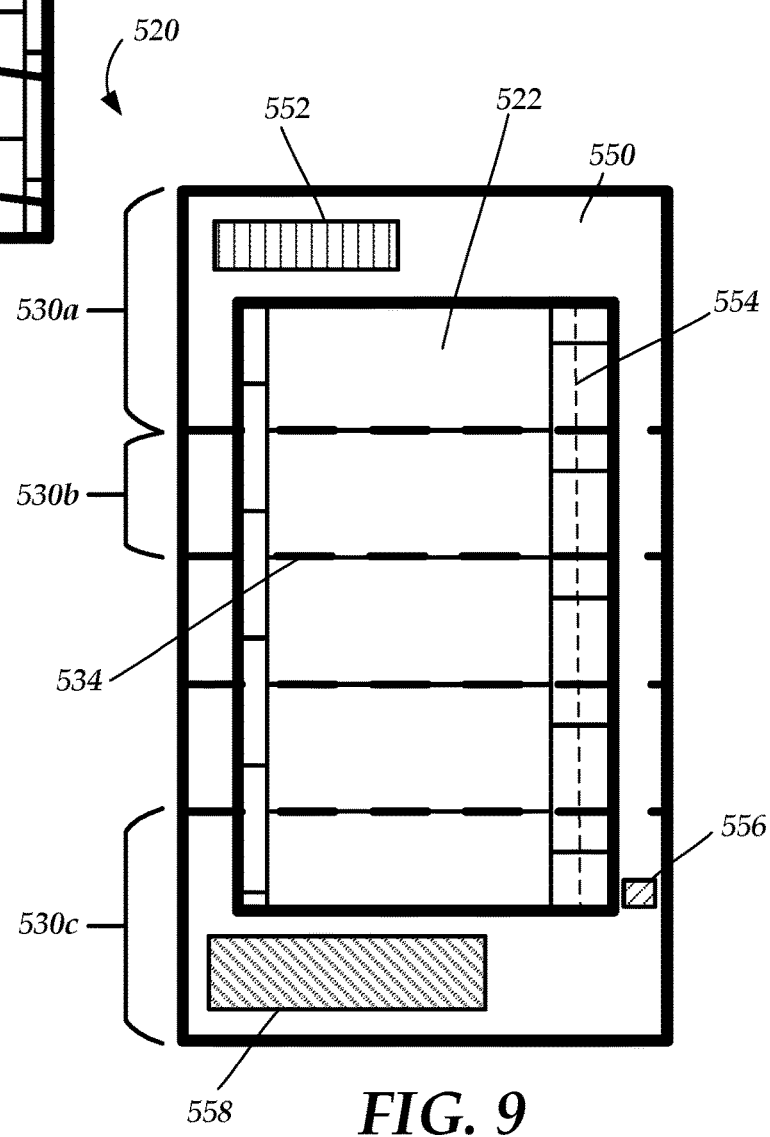
FIG. 9 illustrates one embodiment of a product to be printed with a graphic arranged in a drop pattern and divided into swaths and including additional features, according to the invention.

In at least some embodiments, the swaths are identical, as illustrated, for example, in FIGS. 5 and 6 with swath 530. In at least some embodiments, there may be two or more different swaths, as illustrated, for example, in FIG. 9 with swaths 530a, 530b, 530c. The different swaths can differ in content or arrangement of the full/partial copies of the graphic. In at least some of these embodiments, at least one of the swaths is repeated in the product. In at least some embodiments with multiple different swaths, at least one of the swaths is not repeated (for example, swaths 530a, 530c of FIG. 9 are not repeated as described in more detail below.)

Figure 7:
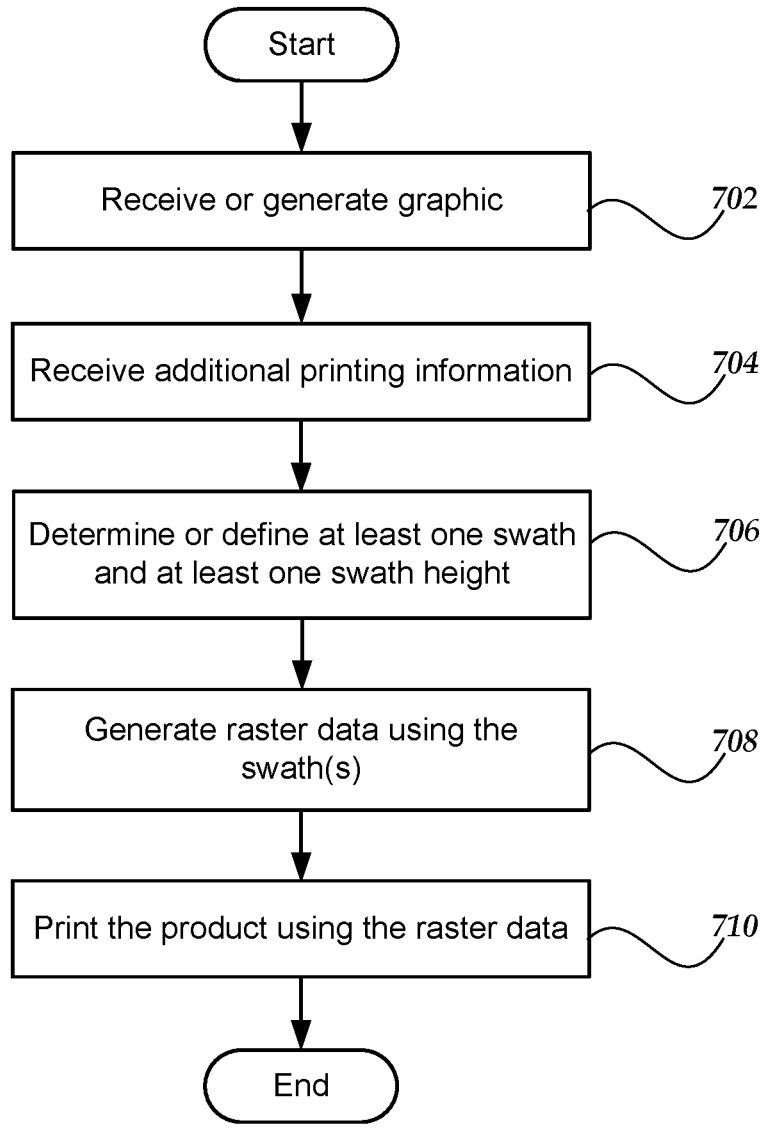
FIG. 7 is a flowchart of one embodiment of a method of printing a product that includes a tessellated graphic, according to the invention.
Figure 8:
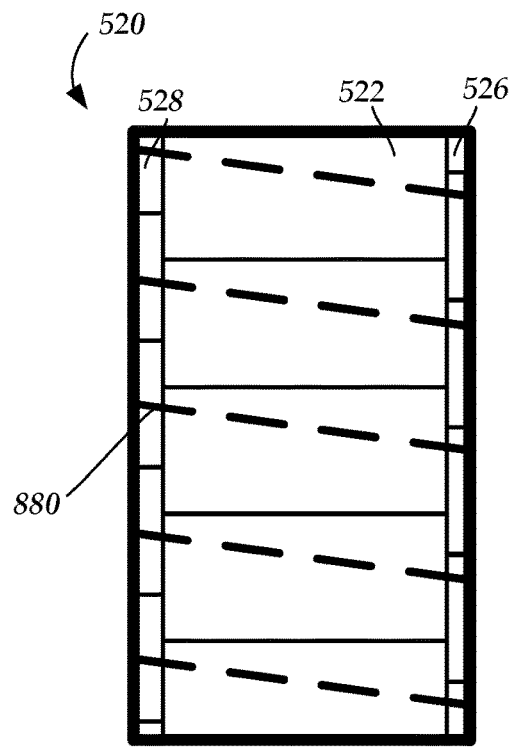
FIG. 8 illustrates one embodiment of a wallcovering to be printed with a graphic arranged in a drop pattern and divided into swaths, according to the invention.

FIG. 7 is a flow chart of one embodiment of a method for printing a product with a tessellated pattern. In step 702, the graphic is submitted to, received by, or generated on a system for processing the graphic such as a raster image processor, a printing system, or any other suitable system that contains at least one processor. The graphic can be in any suitable form including, but not limited to, the following forms: PDF, EPS, TIFF, JPEG, PNG, or the like. The graphic is represented by the box 222 in FIGS. 2 to 4 and box 522 in FIGS. 5, 6, and 8 to 10. The graphic and box 522 represent a base repeat unit that is to be tessellated to produce the product 520.

It will be understood that the graphic can include two or more elements that can be generated, submitted, or received separately. A graphic with two or more elements may be a composite of the elements or may simply be separate elements that are printed as the base repeat unit (e.g., the graphic.)

In at least some embodiments, the graphic is scaled or stretched to ensure that the width or height or both completely cover a whole number of device pixels at the rendering resolution. In at least some embodiments, the graphic can be deliberately scaled to achieve a desired appearance.

In step 704, additional printing information is received or generated. This additional printing information can include, but is not limited to, one or more of the following: width of the product; length of the product; a tessellation pattern (for example, a style or type of tessellation); a printing device; a medium that is to be printed upon; or the like or any combination thereof. In at least some embodiments, some or all of the printing information is received with the graphic. In at least some embodiments, some or all of the printing information is generated or provided by a user of the system and can be input using any suitable input device. The tessellation pattern can be, but is not limited to, a grid, drop, or brick pattern. Any other suitable tessellation pattern can also be used.

In step 706, at least one swath and at least one swath height are determined or defined. The product is divided into multiple swaths that can be individually processed. Each swath contains one or more full copies of the graphic, one or more partial copies of the graphic, or any combination thereof. When the product contains two or more instances of a particular swath, that swath is a repeated swath. In at least some embodiments, the product has two or more repeated swaths. In at least some embodiments, the product has at least one swath (i.e., an unrepeated or non-repeated swath) that is not a repeated swath. In at least some embodiments, the product has at least two swaths that are not repeated swaths.

As an example, a wallcovering may use a graphic that is the width (for example, 510 mm) of the printed product, although, in at least some embodiments, the printing will be done on a roll of medium that is wider (for example, 530 mm) than the graphic. In at least some embodiments, the graphic is centered on the printed product with very narrow portions of partial copies of the graphic showing to the left and right so that no unprinted areas appear when the wallcovering is hung if the cutting to the final width is not 100% accurate. In at least some embodiments, the partial copies of the graphic on each side are adjusted vertically such that they continue the design seamlessly as illustrated using the diagonal wallcovering lines 880 in FIG. 8.

In at least some embodiments, for grid and drop patterns, the minimum swath height is the height of one copy of the graphic, as illustrated in FIG. 5. In at least some embodiments, for brick patterns, the minimum swath height is the height of the graphic multiplied by the number of rows of graphics required to bring the horizontal position of the graphics back in line with the first row, as illustrated in FIG. 6. As an example, if each row of graphics is offset horizontally by one third of the width of the graphic, the minimum swath height would be three times the height of a single graphic, as illustrated, for example, in FIG. 6.

In at least some embodiments, the swath height of a swath is the height of the graphic, as illustrated, for example, in FIG. 5. In at least some embodiments, the swath height of a swath is an integer (for example, two, three, four, five, six, or more) multiple of the height of the graphic, as illustrated, for example, in FIGS. 6 and 10. In at least some embodiments, a swath height of a swath is determined to be a minimum swath height that produces at least one repeated swath. It will be understood that not all of the swaths are repeated, as described, for example, in more detail below with respect to FIG. 9.

In at least some embodiments, the swath height of all of the swaths is identical, as illustrated, for example, in FIGS. 5 and 6. This may occur even in embodiments with two or more different swaths (e.g., swaths that differ in content or arrangement of the full/partial copies of the graphic.) In at least some embodiments with two or more different swaths, the swath heights of at least two of the different swaths are not equal, as illustrated, for example in FIG. 9 (swaths 530a, 530b, and 530c can have different swath heights) and FIG. 10 (swaths 530d and 530e have different swath heights.) In at least some embodiments with two or more different swaths, the swath heights of at least two of the different swaths are equal.

In at least some embodiments, there may be limitations or requirements for the downstream processing during rendering that require a minimum swath height. For examples, downstream processes may require a minimum raster height or that the raster delivered is an integer multiple of some number of scan lines. In at least some embodiments, the minimum swath height calculated above may be multiplied (preferably, by an integer) until the swath height meets these additional criteria.

In at least some embodiments, if the height of the tessellated graphics is not an exact multiple of the swath height, then a second swath (e.g., a trailing swath) can be defined for the trailing part of the tessellated graphics.

Figure 10:
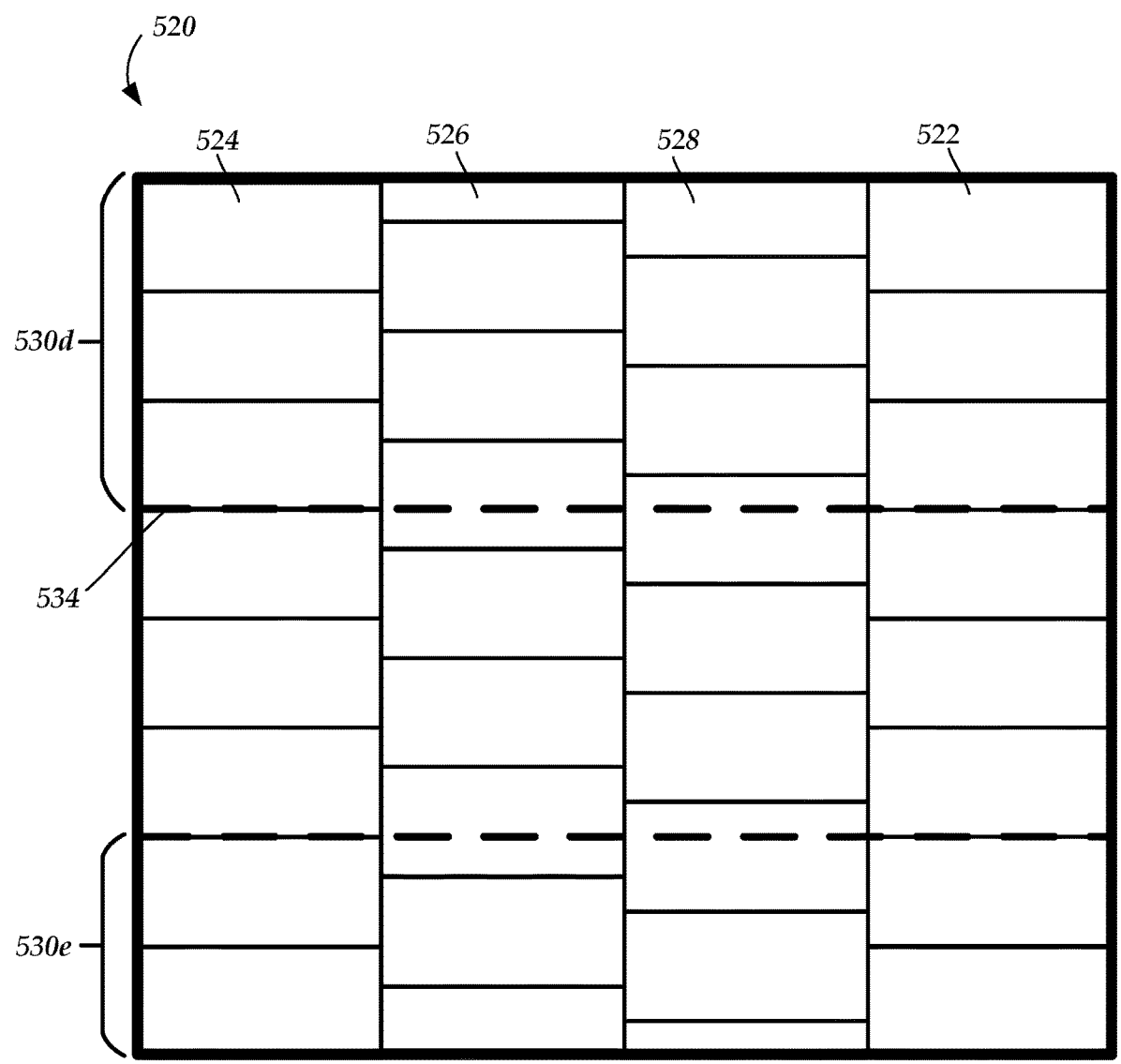
FIG. 10 illustrates another embodiment of a product to be printed with a graphic arranged in a drop pattern and divided into swaths, according to the invention.

FIG. 10 illustrates one embodiment (as compared to the embodiment of FIG. 5) where the swath height of repeated swath 530d is the graphic height multiplied by a factor of three. In this embodiment, the product 520 includes two instances of a repeated swath 530d with fourteen full/partial copies of the graphic 522 (which is to be delivered to the printing device twice), followed by a trailing swath 530e that is smaller with ten full/partial copies of the graphic.

In step 708, raster data is generated using the swath(s) using a raster image processor (RIP) or other suitable processing device which may or may not be part of the printing device. In at least some embodiments, the repeated swath(s) 530 is/are to be printed multiple times to produce the product 520. In at least some embodiments, the swaths 530 are to be printed with no gaps between the swaths to produce the product 520. As an example, to produce the product 520 illustrated in FIG. 5, only one swath 530, which includes six full/partial copies of the graphic 522, is rendered by the RIP and printed eight times to produce the product 520 of FIG. 5.

By identifying one or more repeated swaths, rendering in the digital front end (DFE) can be reduced. The rendering can include, for example, transforming the graphic into raster data at the desired resolution in both dimensions, color managing the raster data, and calibrating the raster data into the device color space by taking account of the inks to be used and the tonal response of those inks. In at least some embodiments, the raster data is halftone screened (for example, screened to match the bit depth of the printing device.) In at least some embodiments, when a halftone screen that is applied has a noticeable repeat pattern, then every instance (or multiple instances, for example, two adjacent instances which can be alternated) of the swath is screened individually. In at least some instances, when the resolution of the raster data is relatively high and the halftone screen is well dispersed, the raster data can be screened once and the same screened raster can be sent to the printing device multiple times without a visible artifact at the swath boundary.

In step 710, the product is printed using the raster data. For example, the raster data corresponding to swath 530 of FIG. 5 is sent to the printing device eight times to produce the product 520 of FIG. 5.

In at least some embodiments, additional space or additional graphics are positioned adjacent to, or around, the tessellated graphic. Examples of additional graphics include, but are not limited to, a process control barcode, a cutting guide, an eye mark, a readable banner, or the like or any combination thereof. As an example, FIG. 9 illustrates a product 520, such as a roll of wallcovering, that includes a narrow white space 550 at the top; a banner 552 with product information; a cutting guide 554 along the length and close to the right-hand side of the tessellated graphic 522; an eye mark 556 in the lower right (or elsewhere); and a banner 558 identifying the manufacturer, design, job number, customer, or the like at the bottom where it will be visible when the product is packaged as, for example, a roll.

In at least some embodiments, any marks that continue across all swaths of the tessellated pattern may be included in the swath or overlaid as a part of the swath raster data. For example, the cutting guide 554 in FIG. 9 can fall into this category.

In at least some embodiments, when an additional graphic, such as the banner 552 or the banner 558, is included at the top or bottom of the product 520, the additional graphic may be a) delivered as a separate swath; b) amalgamated with some number of rows of the tessellated graphic 520 (for example, to achieve a minimum swath height); or c) included in the first or last swath. In FIG. 9, the banner 552 is included in the first swath 530a and the banner 558 is included in the last swath 530c. The intermediate swath 530b is a repeated swath that can be printed three times.

In at least some embodiments, an eye mark 556 near the end of the tessellated pattern may also be included in a swath (for example, the final swath 530c in FIG. 9). In at least some embodiments, the inclusion of the eye mark 556 or the banner 558 can increase the swath height of the final swath (swath 530c in FIG. 9) as compared to a repeating swath (swath 530b in FIG. 9).

In at least some embodiments, a number of related products can be printed with slight variations. As an example, a sequence of wallcovering products can be printed for a specific height of wall, with each wallcovering product in the sequence starting at a different point in the pattern of tessellated graphics. This allows the sequence of wallcovering products to be hung in sequence next to each other with adjacent wallcovering products aligned correctly (e.g., with the graphics in adjacent wallcovering products forming a drop pattern (see, FIG. 3)) In at least some embodiments, the leading (e.g., first) swath and the trailing (e.g., last or final) swath for the different products in the sequence will be different, but the intermediate swaths (e.g., the swaths between the leading and trailing swaths) for all of the wallcovering products can be the same repeating swath. In at least some embodiments, this intermediate swath can be rendered just once for all of the wallcovering products of the sequence and, at least in some embodiments, the leading and trailing swaths being rendered individually for each of the products in the sequence.

In at least some embodiments, the tessellation of the repeated graphic and the division of the product into swaths may be done within a DFE or the tessellation or division (or both) may be done upstream of the DFE. In at least some embodiments, the graphic or the repeating swaths and, if needed, the leading or trailing swaths can be delivered to the DFE in any suitable form, for example, as PDF pages. In at least some embodiments, the delivery can occur in a single job submission or multiple job submissions.

The examples described above illustrate swath(s) across a tall, narrow output, which, at least in some embodiments, is printed onto a substrate pulled from one roll and rewound onto another. It will be understood, however, that the methods and systems described herein can also apply to instances in which the leading edge of the design is to the left, right, or bottom of the product instead of the top.

Figure 11:
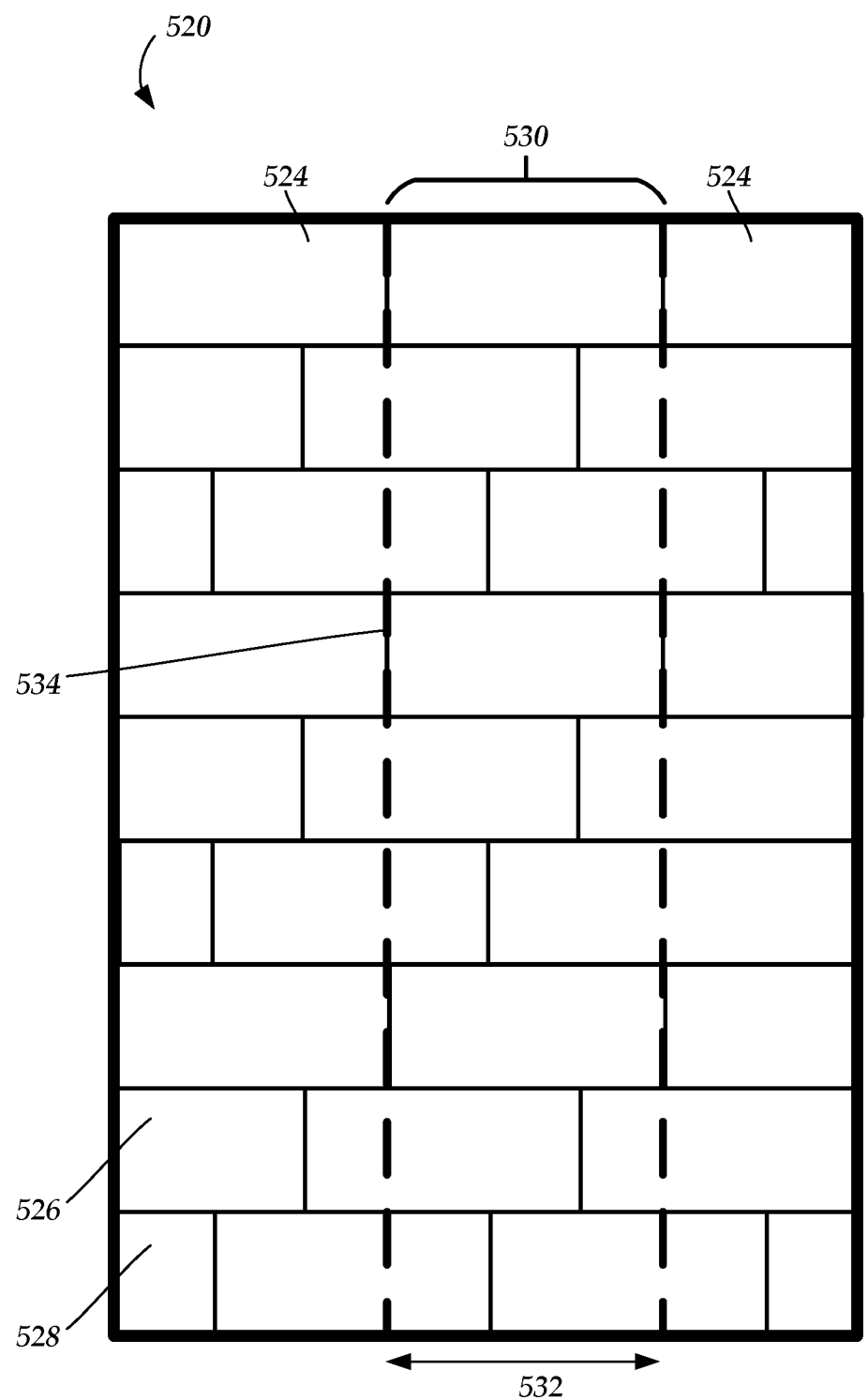
FIG. 11 illustrates another embodiment of a product to be printed with a graphic arranged in a brick pattern and divided into vertical swaths, according to the invention.
Figure 12:
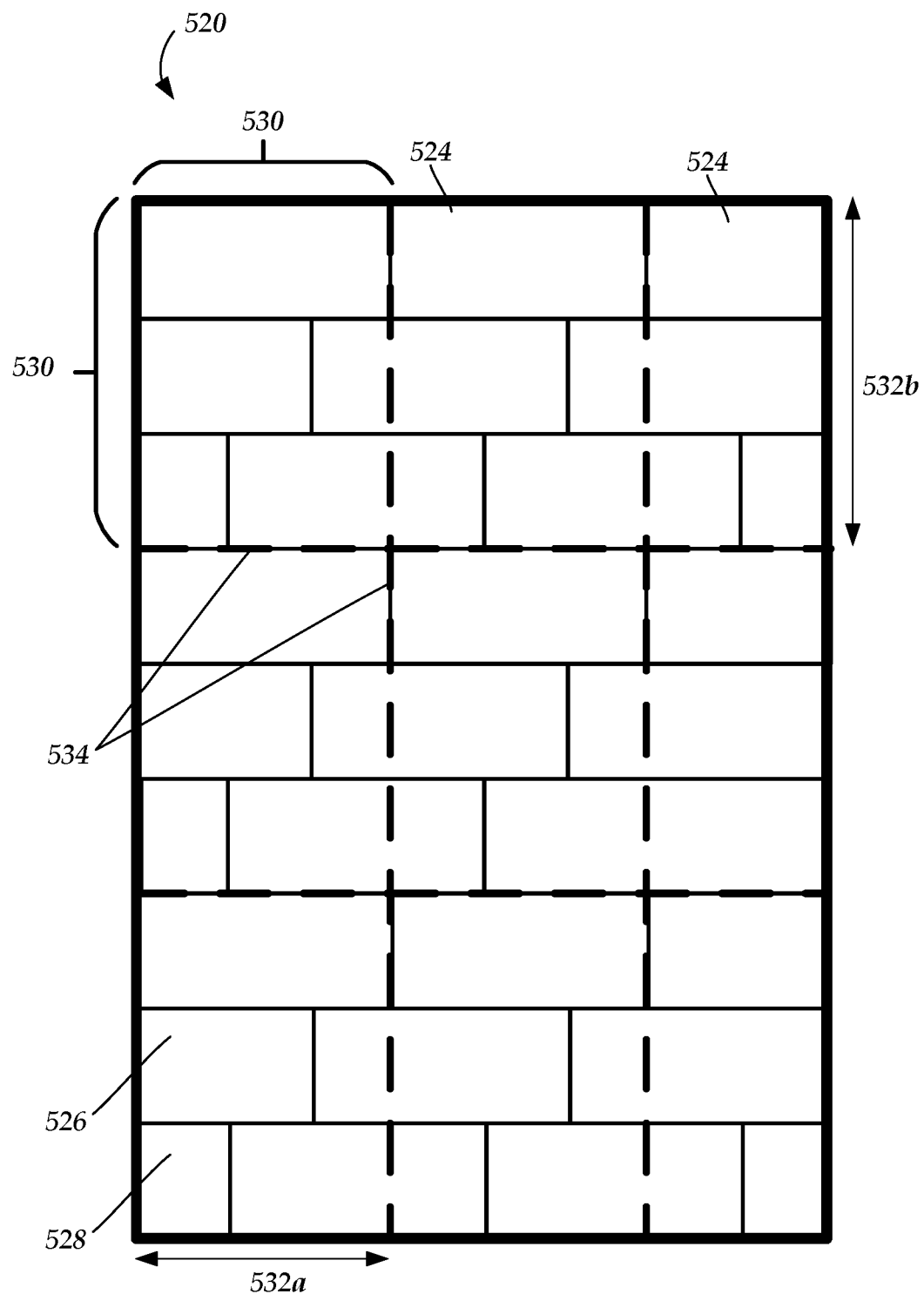
FIG. 12 illustrates a further embodiment of a product to be printed with a graphic arranged in a brick pattern and divided into tiled swaths, according to the invention. #

The examples described above utilize horizontal swaths that are arranged in a vertical sequence, as illustrated, for example, in FIG. 6. It will be understood that the systems and methods described herein can also be applied to vertical swaths arranged in a horizontal sequence, as illustrated in FIG. 11. It will also be understood that the systems and methods described herein can also be applied to swaths that do not extend the entire horizontal or vertical length of a product (e.g., "tiled swaths"), but rather are arranged (or tiled) in both the horizontal and vertical directions to forms the product, as illustrated in FIG. 12 with swath heights 532a, 532b corresponding to the dimensions of swath 530. Any combination of horizontal swaths, vertical swaths, or tiles can be used.

The methods and systems described herein may be embodied in many different forms and should not be construed as limited to the embodiments set forth herein. Accordingly, the methods and systems described herein may take the form of an entirely hardware embodiment, an entirely software embodiment or an embodiment combining software and hardware aspects. Systems referenced herein typically include memory and typically include methods for communication with other devices including mobile devices. Methods of communication can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method for printing a product that includes a graphic that is tessellated, the method comprising:
   receiving or generating the graphic and a tessellation pattern for the graphic;
   determining a first repeated swath using at least the graphic and the tessellation pattern, wherein the product to be printed comprises at least two instances of the first repeated swath, wherein the first repeated swath comprises i) at least two full copies of the graphic, ii) at least two partial copies of the graphic; or iii) at least one full copy and at least one partial copy of the graphic;
   generating raster data of the first repeated swath; and
   printing the product using the raster data of the first repeated swath to print the first repeated swath at least twice.

2. The method of claim 1, wherein the tessellation pattern is a brick pattern.

3. The method of claim 1, wherein the tessellation pattern is a drop pattern.

4. The method of claim 1, further comprising
   determining a second repeated swath, wherein the product to be printed comprises at least two instances of the second repeated swath, wherein the second repeated swath comprises i) at least two full copies of the graphic, ii) at least two partial copies of the graphic; or iii) at least one full copy and at least one partial copy of the graphic;
   generating the raster data of the second repeated swath;
   wherein printing the product comprises printing the product using the raster data of the second repeated swath to print the second repeated swath at least twice.

5. The method of claim 1, further comprising
   determining an unrepeated swath, wherein the product to be printed comprises only a single instance of the unrepeated swath, wherein the unrepeated swath comprises i) at least two full copies of the graphic, ii) at least two partial copies of the graphic; or iii) at least one full copy and at least one partial copy of the graphic;

generating the raster data of the unrepeated swath;

wherein printing the product comprises printing the product using the raster data of the unrepeated swath to print the unrepeated swath only once.

6. The method of claim 5, wherein the unrepeated swath is a combination of the repeated swath and at least one additional graphic.

7. The method of claim 6, wherein the at least one additional graphic is selected from a banner, an eye mark, a cutting guide, or any combination thereof.

8. The method of claim 5, wherein printing the product comprises printing the unrepeated swath first or last.

9. The method of claim 1, wherein the first repeated swath is a horizontal swath extending horizontally from one edge of the product to an opposite edge of the product.

10. The method of claim 1, wherein determining a first repeated swath comprises determining a first height of the first repeated swath, wherein the first height equals a height of the graphic.

11. The method of claim 1, wherein determining a first repeated swath comprises determining a first height of the first repeated swath, wherein the first height equals a height of the graphic multiplied by an integer greater than one.

12. A system for printing a product that includes a graphic that is tessellated, the system comprising:
at least one processor configured and arranged to perform actions, the actions comprising:
receiving or generating the graphic and a tessellation pattern for the graphic;
determining a first repeated swath using at least the graphic and the tessellation pattern, wherein the product to be printed comprises at least two instances of the first repeated swath, wherein the first repeated swath comprises i) at least two full copies of the graphic, ii) at least two partial copies of the graphic; or iii) at least one full copy and at least one partial copy of the graphic;
generating raster data of the first repeated swath; and
printing the product using the raster data of the repeated swath to print the first repeated swath at least twice.

13. The system of claim 12, wherein the actions further comprise
determining a second repeated swath, wherein the product to be printed comprises at least two instances of the second repeated swath, wherein the second repeated swath comprises i) at least two full copies of the graphic, ii) at least two partial copies of the graphic; or iii) at least one full copy and at least one partial copy of the graphic;
generating the raster data of the second repeated swath;
wherein printing the product comprises printing the product using the raster data of the second repeated swath to print the second repeated swath at least twice.

14. The system of claim 12, wherein the actions further comprise
determining an unrepeated swath, wherein the product to be printed comprises only a single instance of the unrepeated swath, wherein the unrepeated swath comprises i) at least two full copies of the graphic, ii) at least two partial copies of the graphic; or iii) at least one full copy and at least one partial copy of the graphic;
generating the raster data of the unrepeated swath;
wherein printing the product comprises printing the product using the raster data of the unrepeated swath to print the unrepeated swath only once.

15. The system of claim 14, wherein the unrepeated swath is a combination of the repeated swath and at least one additional graphic.

16. The system of claim 12, further comprising a printing devices that comprises, or is in communication with, the at least one processor.

17. A non-transitory computer-readable medium having processor-executable instructions for printing a product that includes a graphic that is tessellated, the processor-executable instructions when installed onto a device enable the device to perform actions, the actions comprising:
receiving or generating the graphic and a tessellation pattern for the graphic;
determining a first repeated swath using at least the graphic and the tessellation pattern, wherein the product to be printed comprises at least two instances of the first repeated swath, wherein the first repeated swath comprises i) at least two full copies of the graphic, ii) at least two partial copies of the graphic; or iii) at least one full copy and at least one partial copy of the graphic;
generating raster data of the first repeated swath; and
printing the product using the raster data of the first repeated swath to print the repeated swath at least twice.

18. The non-transitory computer-readable medium of claim 17, wherein the actions further comprise
determining a second repeated swath, wherein the product to be printed comprises at least two instances of the second repeated swath, wherein the second repeated swath comprises i) at least two full copies of the graphic, ii) at least two partial copies of the graphic; or iii) at least one full copy and at least one partial copy of the graphic;
generating the raster data of the second repeated swath;
wherein printing the product comprises printing the product using the raster data of the second repeated swath to print the second repeated swath at least twice.

19. The non-transitory computer-readable medium of claim 17, wherein the actions further comprise
determining an unrepeated swath, wherein the product to be printed comprises only a single instance of the unrepeated swath, wherein the unrepeated swath comprises i) at least two full copies of the graphic, ii) at least two partial copies of the graphic; or iii) at least one full copy and at least one partial copy of the graphic;
generating the raster data of the unrepeated swath;
wherein printing the product comprises printing the product using the raster data of the unrepeated swath to print the unrepeated swath only once.

20. The non-transitory computer-readable medium of claim 19, wherein the unrepeated swath is a combination of the repeated swath and at least one additional graphic.

* * * * *